(12) United States Patent
Warden et al.

(10) Patent No.: US 11,466,750 B2
(45) Date of Patent: Oct. 11, 2022

(54) LIQUID-MECHANICAL ISOLATOR

(71) Applicant: The Boeing Company, Chicago, IL (US)

(72) Inventors: Harry Kendall Warden, Huntsville, AL (US); Jeffrey Wayne Weathers, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 412 days.

(21) Appl. No.: 16/522,574

(22) Filed: Jul. 25, 2019

(65) Prior Publication Data
US 2021/0025473 A1 Jan. 28, 2021

(51) Int. Cl.
*F16F 13/00* (2006.01)
*F16M 13/02* (2006.01)

(52) U.S. Cl.
CPC .......... *F16F 13/002* (2013.01); *F16M 13/02* (2013.01); *F16F 13/00* (2013.01); *F16F 2232/08* (2013.01); *F16F 2236/045* (2013.01)

(58) Field of Classification Search
CPC ........ F16F 13/002; F16F 13/00; F16F 13/005; F16F 13/007; F16F 13/02; F16F 13/06; F16F 2232/08; F16F 2236/045
See application file for complete search history.

(56) References Cited

U.S. PATENT DOCUMENTS

| | | | |
|---|---|---|---|
| 2,861,795 A * | 11/1958 | Blake | F16F 13/00 267/225 |
| 3,682,461 A | 8/1972 | Wachenheim | |
| 3,747,913 A | 7/1973 | Savery | |
| 3,957,260 A * | 5/1976 | Martin | B60Q 1/08 267/174 |
| 5,487,454 A * | 1/1996 | Klembczyk | F16F 1/12 188/280 |
| 5,823,517 A * | 10/1998 | Huang | B60G 17/0272 267/221 |
| 6,520,524 B1 * | 2/2003 | Costa | B60G 17/0416 280/276 |

(Continued)

FOREIGN PATENT DOCUMENTS

| | | |
|---|---|---|
| DE | 938352 C | 1/1956 |
| DE | 202005009909 U1 | 10/2006 |
| WO | 2019080576 A1 | 5/2019 |

OTHER PUBLICATIONS

Defense Solutions for Energy Absorption and Vibration Isolation, ITT, Engineered for Life, Brochure, Dec. 2011, USA, 6 pages.

(Continued)

*Primary Examiner* — Nkeisha Smith
(74) *Attorney, Agent, or Firm* — Kolisch Hartwell, P.C.

(57) ABSTRACT

Shock and vibration isolators and their use to isolate loads from vibration and shock, where the isolators include a fluid spring assembly and a mechanical spring assembly, where the fluid spring assembly and the mechanical spring assembly are arranged in series. The mechanical spring assembly includes a first spring and a second spring arranged so that compression of the mechanical spring assembly simultaneously directly compresses the first spring and indirectly compresses the second spring via an intermediate actuator, such that the first and second spring are compressed in parallel.

21 Claims, 5 Drawing Sheets

(56) References Cited

U.S. PATENT DOCUMENTS

| | | | | |
|---|---|---|---|---|
| 7,350,774 B2* | 4/2008 | Chun | ............... | F16F 1/041 |
| | | | | 267/169 |
| 2006/0086582 A1* | 4/2006 | Spyche | ............... | E04H 9/02 |
| | | | | 188/378 |
| 2012/0286462 A1* | 11/2012 | Pepka | ............... | F16F 3/04 |
| | | | | 267/177 |
| 2014/0353098 A1* | 12/2014 | Manuel | ............... | F16F 13/007 |
| | | | | 188/313 |
| 2015/0137436 A1* | 5/2015 | Fitterling | ............... | F16F 9/516 |
| | | | | 267/140.13 |
| 2016/0265619 A1* | 9/2016 | Kull | ............... | E05F 1/1025 |
| 2016/0363186 A1* | 12/2016 | McCoy | ............... | F16F 13/005 |
| 2017/0342781 A1* | 11/2017 | Reimers | ............... | F16F 9/26 |
| 2019/0375263 A1* | 12/2019 | Knapczyk | ............... | F16F 9/49 |
| 2020/0370617 A1* | 11/2020 | Sun | ............... | E04H 9/0237 |
| 2020/0400206 A1* | 12/2020 | Zohar | ............... | F16F 1/128 |

OTHER PUBLICATIONS

European Patent Office, Extended European Search Report regarding European Patent Application No. 20175893.5, dated Nov. 5, 2020, 7 pages.

\* cited by examiner

LIQUID-MECHANICAL ISOLATOR

FEDERALLY SPONSORED RESEARCH OR DEVELOPMENT

This invention was made with Government support under Contract No. FA8219-17-C-0001 awarded by the Air Force. The Government has certain rights in this invention.

FIELD

This disclosure relates to isolator apparatus and methods for isolating systems from shock and vibration. More specifically, the disclosure relates to isolator apparatus that include both liquid and mechanical spring assemblies.

INTRODUCTION

Vibration isolation can be used to isolate a system of interest from the environment, in order to eliminate the effect of seismic vibration, traffic vibration, or even vibration due to footsteps. Alternatively, vibration isolation can be used to isolate the environment of the system of interest from vibration and noise produced by the system of interest. Shock, in contrast to vibration, is typically considered to be a transient phenomenon, and represents a sharp movement, or pulse. Shock isolation is typically used to protect systems from shocks delivered from the environment.

While a variety of isolation systems exist, many include simple pads or mounts that incorporate elastomers or other substances that deaden or dampen vibration, suitable for isolating tables or even small engines. Where larger isolation systems are required, the isolation system can include larger and more complex mechanical isolators, including spring mounts, pneumatic mounts, hanging mounts, and/or cable (wire rope) isolators.

Where there is a need for more robust shock isolation, isolators incorporating metal coil springs can be strengthened by increasing the size of the coil. Unfortunately, the physical constraints of some systems can create limitations on the size of shock isolator that can be accommodated by the system. What is needed are vibration and shock isolators that provide enhanced isolation capacity while maintaining a small footprint.

SUMMARY

The present disclosure provides shock and vibration isolators useful for isolating loads from shock and vibration.

The disclosure may provide shock and vibration isolators that include a fluid spring assembly and a mechanical spring assembly, where the fluid spring assembly and the mechanical spring assembly are arranged in series. The mechanical spring assembly includes a first spring and a second spring arranged so that a compressive force applied to the mechanical spring assembly simultaneously directly compresses the first spring and indirectly compresses the second spring via an intermediate actuator, such that the first and second spring are compressed in parallel.

The disclosure may provide shock absorbers, where the shock absorbers include a cylindrical housing, a fluid spring assembly disposed at a first end of the cylindrical housing, the fluid spring assembly including a fluid-filled bore and a piston slidably mounted within the bore, and a mechanical spring assembly disposed at a second end of the cylindrical housing and in series with the fluid spring assembly. The mechanical spring assembly includes a first coil spring and a second coil spring disposed sequentially and in alignment within the cylindrical housing, configured so that a compressive force applied to the mechanical spring assembly by the fluid spring assembly results in the first coil spring acting directly on the first coil spring to compress the first coil spring against a bearing block fixed to the cylindrical housing, and the fluid spring assembly simultaneously acting indirectly on the second coil spring via an intermediate actuator that compresses the second coil spring against the second end of the cylindrical housing, the compressive force therefore being applied to the first coil spring and the second coil spring in parallel.

The disclosure may provide a method of isolating a load from vibration and shock, including coupling one or more isolators to the load, and coupling the one or more isolators to the load environment, so that the weight of the load is supported by the one or more isolators. Each isolator includes a fluid spring assembly and a mechanical spring assembly, the fluid spring assembly being disposed at a first end of the isolator and including a fluid-filled bore and a piston slidably mounted within the bore so that a shock transmitted to the isolator from the environment acts upon the fluid spring assembly and the mechanical spring assembly in series. The mechanical spring assembly includes a first coil spring and a second coil spring arranged so that a translation of the fluid spring assembly against the mechanical spring assembly directly compresses the first coil spring between the fluid spring assembly and a bearing block while simultaneously indirectly compressing the second coil spring between an intermediate actuator and a second end of the isolator. As a result the fluid spring assembly is compressed in series with the mechanical spring assembly, and the first coil spring is compressed in parallel with the second coil spring.

The disclosed features, functions, and advantages of the disclosed isolators and methods may be achieved independently in various embodiments of the present disclosure, or may be combined in yet other embodiments, further details of which can be seen with reference to the following description and drawings.

DEFINITIONS

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

"Compressive force" means the force absorbed by the isolators of the present disclosure. Compressive forces include, without limitation, vibrational impulses, seismic impulses, shock waves, and the like, and such compressive forces can be periodic or aperiodic

DESCRIPTION

Various aspects and examples of shock and vibration isolators, shock isolators, and methods for their use are described below and illustrated in the associated drawings. Unless otherwise specified, the disclosed apparatus and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

Figure 1:
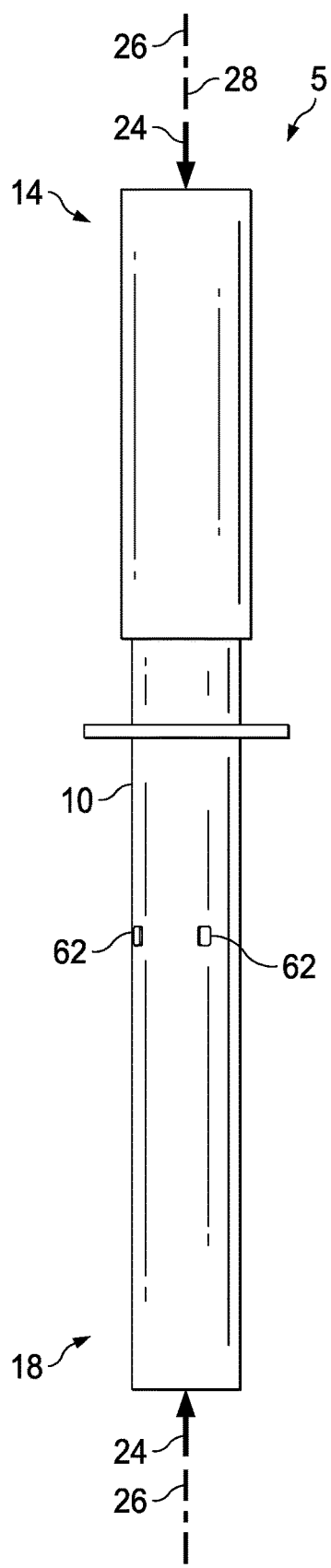
FIG. 1 depicts an illustrative example of a shock and vibration isolator according to the present disclosure.
Figure 2:
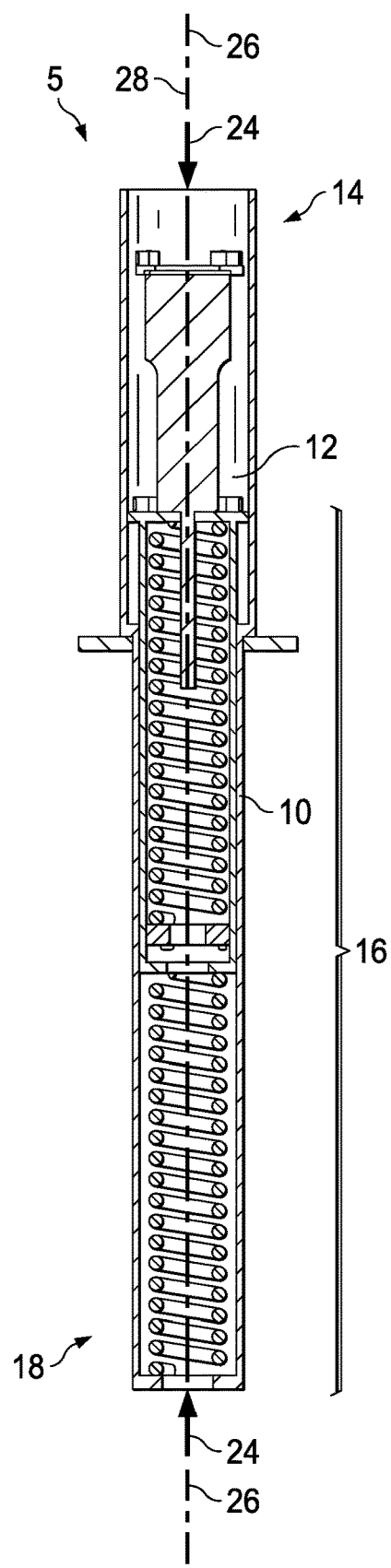
FIG. 2 is a cross-sectional view of the shock and vibration isolator of FIG. 1.

FIGS. 1 and 2 depict an illustrative shock and vibration isolator 5. Isolator 5 includes an isolator housing 10 that at least partially encloses a fluid spring assembly 12 disposed at a first end 14 of isolator housing 10, and a mechanical spring assembly 16, disposed at a second end 18 of isolator housing 10. Fluid spring assembly 12 and mechanical spring assembly 16 are arranged so that the two spring assemblies are in series within housing 10. That is, fluid spring assembly 12 and mechanical spring assembly 16 are arranged end-to-end, so that a compressive force applied to isolator 5 is applied to each spring assembly without a change in the magnitude of the compressive force.

Figure 3:
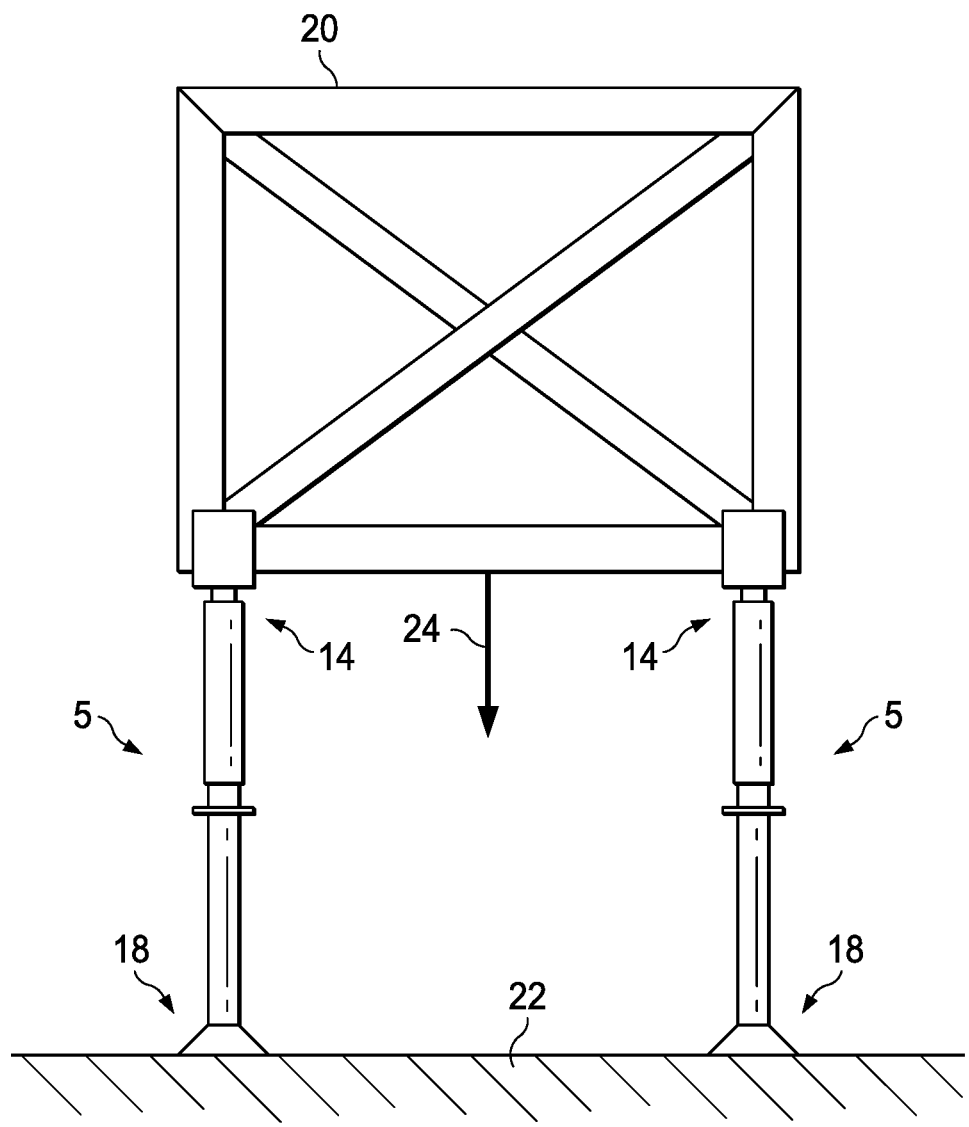
FIG. 3 semi-schematically depicts the isolation of an exemplary load from shock and vibration using shock and vibration isolators according to the present disclosure.

As shown schematically in FIG. 3, isolator 5 is typically configured so that a first end 14 of isolator 5 can be coupled to a load 20, where the load typically includes a system of interest. Second end 18 of isolator 5 is typically configured to be coupled to an environment 22 of load 20. Systems of interest that can benefit from shock and vibration isolation include vehicle suspension systems and sensitive instrumentation. Entire buildings or other facilities can employ shock and vibration isolation to provide seismic isolation and/or protection. A variety of military and/or aerospace applications exist for shock and vibration isolation, including vehicle suspension systems, but also including weapons modules or systems. Load 20 can include one or more vehicles, buildings, instruments, or weapons systems, without limitation and in any combination.

During use, one or more isolators 5 can be disposed between load 20 and load environment 22, so that load 20 is isolated, or protected, from shocks and vibrations from the load environment that could otherwise affect or even damage load 20. By disposing one or more isolators 5 between load 20 and load environment 22, vibrations and shock originating from load environment 22 are absorbed and/or damped by the one or more isolators so that load 20 is not subjected to vibrations or shocks, or is at least subjected to attenuated (damped) vibrations or shocks.

Incoming shocks or vibrations manifest as a compressive force 24 applied to isolator 5. Even though compressive force 24 can originate externally of load 20, from the frame of reference of load environment 22, Compressive force 24 can be considered as corresponding to a movement of load 20 with respect to surrounding load environment 22. From the perspective of isolator 5, compressive force 24 is applied by load 20 at first end 14 of isolator 5, where load 20 is coupled to isolator 5.

Isolator 5 is configured to dampen or absorb the relative motion of load 20 with respect to load environment 22. Isolator 5 can be configured so that it possesses a longitudinal axis 26. Typically, first end 14 and second end 18 of isolator housing 10 are disposed along longitudinal axis 26, and at the end of longitudinal axis 26. During use, isolator 5 can be oriented so that longitudinal axis 26 is substantially aligned with a compression vector 28, that is defined as the vector along which compressive forces can be applied to isolator 5 by load 20. Longitudinal axis 26 of isolator 5 can be, but is not required to be, substantially coincident with compression vector 28.

Figure 4:
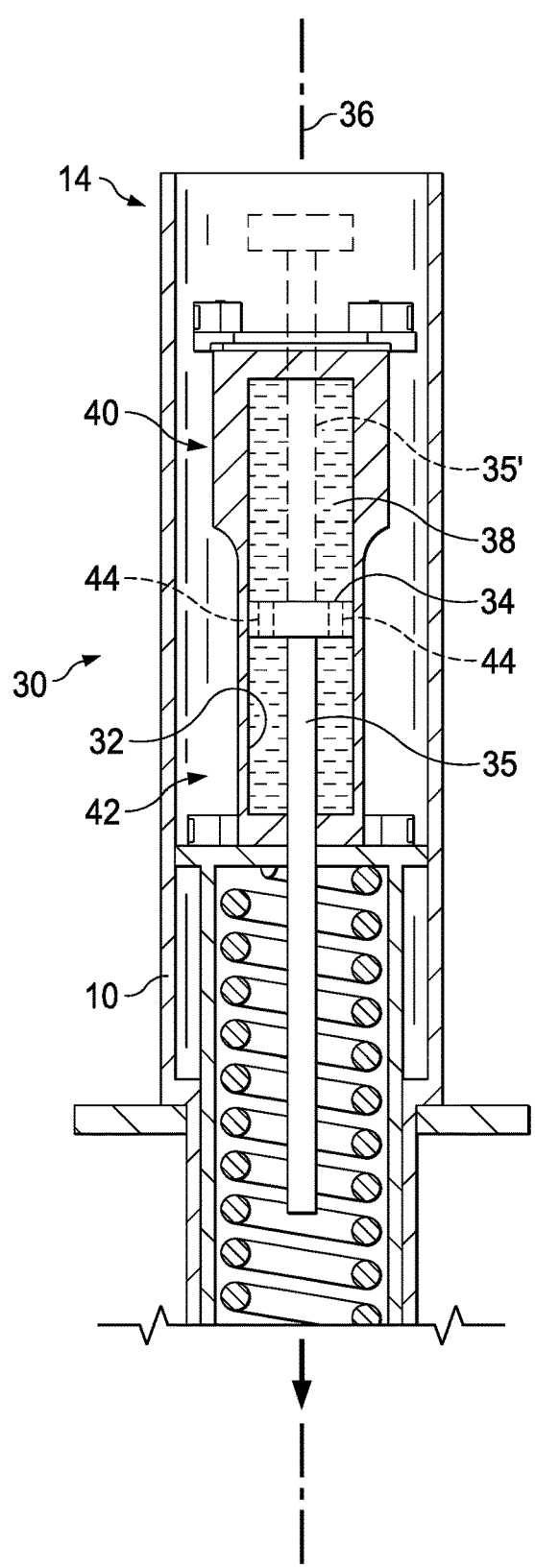
FIG. 4 is a cross-sectional view of a fluid spring assembly for an isolator according to the present disclosure.

Fluid spring assembly 12 includes an appropriate hydraulic-based dashpot, or damper 30, as shown in cross-section in FIG. 4. Typically, fluid spring assembly 12 includes a dashpot or damper that resists movement in response to an applied compressive force due to viscous friction between a moving part and a viscous fluid.

Damper 30 of fluid spring assembly 12 can include a fluid-filled bore 32 and a piston 34 slidably disposed in the fluid-filled bore 32. A compressive force applied to fluid spring assembly 12 via piston shaft 35 urges piston 34 away from first end 14 (i.e. inwardly) along a piston translation axis 36, and the motion of piston 34 is resisted by the viscous fluid 38 filling bore 32. As shown in FIG. 4, piston shaft 35 is configured to urge piston 34 inward when the compressive force is applied to damper 30 from second end 18 of isolator 5. Typically, when the compressive force is to be applied from second end 18, load 20 is coupled to fluid spring assembly 12 via a connection extending along the length of isolator 5. Alternatively, a piston shaft 35' can be coupled to piston 34 that expends outwardly towards first end 14 of isolator 5, and a compressive force can be applied to fluid spring assembly 12 from first end 14.

Piston 34 can separate bore 32 into a first fluid-filled compartment 40 and a second fluid-filled compartment 42, where damper 30 is configured so that when a compressive force urges piston 34 inward along piston translation axis 36, the movement of the piston compresses viscous fluid 38 that fills second compartment 42, thereby dampening (resisting) the movement of piston 34.

Alternatively, or in addition, piston 34 can incorporate one or more apertures 44, configured so that the inward movement of piston 34 forces viscous fluid 38 from second compartment 42 into first compartment 40 through aperture 44, damping the movement of piston 34.

Viscous fluid 38 of fluid spring assembly 12 can be selected for viscosity and stability, and can include one or more natural oils, mineral oils, and/or silicone oils. Fluid 38 can optionally include one or more additives intended to confer desirable properties on fluid 38. One or more additives may be added to confer fire resistance on fluid 38, to increase the fluid's operating temperature range, to lower the fluid's operating temperature range, to resist corrosion, and to resist oxidation, among other properties.

A variety of alternative dashpot designs and hydraulic spring designs, other than the piston and fluid-filled bore disclosed herein, can also be used in fluid spring assembly 12 without departing from the spirit and scope of the disclosed isolator.

Mechanical spring assembly 16, when considered as a single spring, is coupled in series with fluid spring assembly 12. That is, as a compressive force is applied to fluid spring assembly 12, the compressive force is also applied to mechanical spring assembly 16. However, mechanical spring assembly 16 in turn includes two or more mechanical springs, and the application of the compressive force on mechanical spring assembly 16 results in each of the plurality of mechanical springs being compressed in parallel.

In order to illustrate the advantageous nature of this configuration for isolator 5, we can first consider a liquid-mechanical isolator having a fluid spring assembly with a spring constant $k_f$, a first mechanical spring with a spring constant $k_1$, and a second mechanical spring with a spring constant $k_2$, where the isolator is configured so that the fluid spring assembly and the mechanical spring assembly are arranged in series, and the first mechanical spring is arranged in series with the second mechanical spring. As all three spring elements are disposed in series, the spring constant of the overall isolator $k_i$ can be calculated using the formula:

$$\frac{1}{k_i} = \frac{1}{k_f} + \frac{1}{k_1} + \frac{1}{k_2}$$

For the purposes of illustration, we can set the spring constants for the fluid spring assembly and each of the mechanical springs to be equal, each having a spring constant of k. Solving for the effective isolator spring constant $k_i$ then gives the following result:

$$k_i = \frac{k}{3}$$

In contrast, a liquid-mechanical isolator according to the present disclosure would include a mechanical spring assembly in which a first mechanical spring and second mechanical spring are functionally arranged in parallel, while the mechanical spring assembly as a whole is arranged in series with the fluid spring assembly, as described above. In the case of the liquid-mechanical isolator of the disclosure, the spring constant of the overall isolator $k_i$ can be calculated using the formula:

$$\frac{1}{k_i} = \frac{1}{k_f} + \frac{1}{(k_1 + k_2)}$$

Again, setting $k_f = k_1 = k_2 = k$, solving for $k_i$ gives the result:

$$k_i = \frac{2k}{3}$$

Therefore by arranging the two mechanical springs in parallel rather than placing them in series, the effective spring constant of the resulting isolator is doubled, without increasing the footprint of the isolator itself. The isolators of the present disclosure can therefore provide an increased shock isolation capacity for important and/or delicate loads without requiring a larger isolator footprint.

Figure 5:
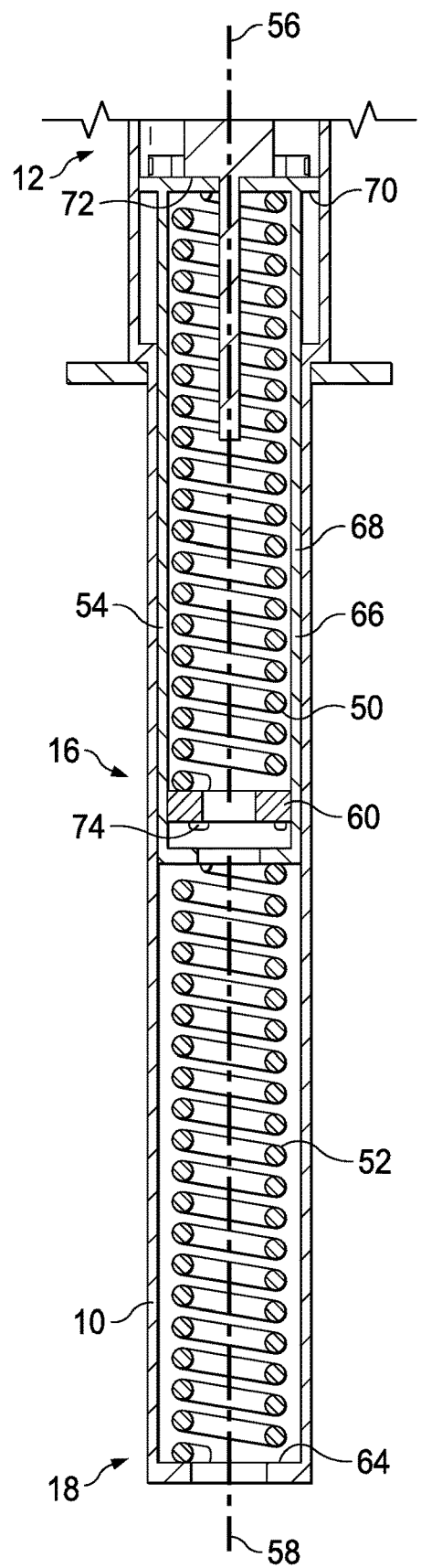
FIG. 5 is a cross-sectional view of a mechanical spring assembly for an isolator according to the present disclosure, prior to compression.
Figure 6:
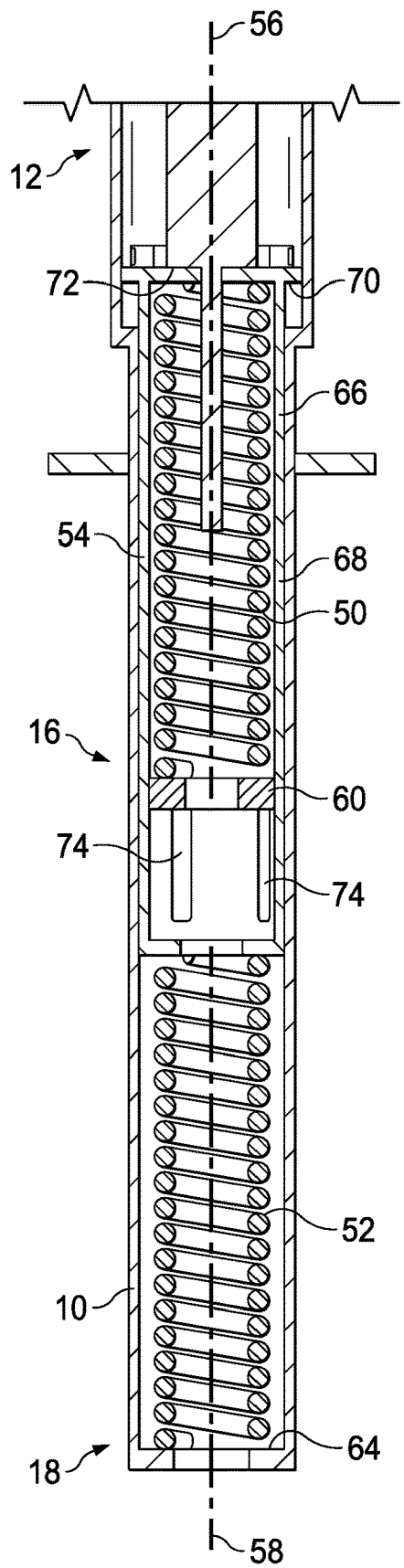
FIG. 6 is a cross-sectional view of the mechanical spring assembly of FIG. 5 during compression.

As shown in the illustrative example of FIGS. 5 and 6, mechanical spring assembly 16 can include a first mechanical spring 50 and a second mechanical spring 52. First spring 50 and second spring 52 are functionally and effectively arranged in parallel, as the application of a compressive force to mechanical spring assembly 16 can directly compress first spring 50, and indirectly and simultaneously compress second spring 52 via an intermediate actuator 54.

Each of first spring 50 and second spring 52 can be mechanical springs. Any mechanical spring that can be configured for use in mechanical spring assembly 16 is a suitable spring for the purposes of this disclosure, and first spring 50 and second spring 52 need not be identical or even the same type of mechanical spring. Typically, each of springs 50 and 52 are compression springs, such as for example helical coil springs.

Where first spring 50 and second spring 52 are compression coil springs, each of first spring 50 and second spring 52 defines a respective longitudinal axis. First spring 50 and second spring 52 can be arranged so that a first longitudinal axis 56 of first spring 50 is aligned with a second longitudinal axis 58 of second spring 52, and each of first longitudinal axes 56 and second longitudinal axis 58 are similarly aligned with piston translation axis 36. Isolator 5 can be configured so that each of first longitudinal axis 56, second longitudinal axis 58, and piston translation axis 36 are coincident with the others. Typically, each of first longitudinal axis 56, second longitudinal axis 58, and piston translation axis 36 are coincident with each other and with compression vector 28 of isolator 5.

First spring 50 and second spring 52 can each exhibit a spring constant that is indicative of the stiffness of the spring. The first spring constant of first spring 50 and second spring constant of second spring 52 can be, but are not required to be, substantially equal. Due to the ability of first spring 50 and second spring 52 to have different spring constants, isolator 5 offers the useful ability of adjusting and fine-tuning the capacity and/or response profile of isolator 5 by replacing one or more of first spring 50 and second spring 52 with springs having different strengths.

First spring 50 is configured to be compressed between fluid spring assembly 12 and a fixed bearing block 60 that is fixed to isolator housing 10. Bearing block 60 can be securely fixed to isolator housing 10, such that bearing block 60 will not move under force applied by first mechanical spring 50. For example, bearing block 60 can be coupled to isolator housing 10 at one or more connection points 62.

Simultaneously, as first spring 50 is directly compressed, the shared compressive force applied by mechanical spring assembly 16 is indirectly applied to second spring 52 via intermediate actuator 54, which compresses second spring 52 against an interior surface 64 at second end 18 of isolator housing 10.

Any configuration of intermediate actuator 54 that can effectively transfer the compressive force of fluid spring assembly 12 to second spring 52 is an appropriate intermediate actuator. As shown in FIGS. 5 and 6, intermediate isolator 54 can include an actuator cylinder 66 that is slidably disposed within isolator housing 10. A sidewall 68 of actuator cylinder 66 surrounds at least a portion of first spring 50 within housing 10, and intermediate actuator 54 can be configured so that actuator sidewall 68 can slidably translate within isolator housing 10 past bearing block 60 so as to be able to compress second spring 52, as shown in FIG. 6.

As an example, and as shown in FIGS. 5 and 6, actuator cylinder 66 can be in contact at a first actuator end 70 with an inner surface 72 of fluid spring assembly 12, and in contact at a second actuator end 70 with an inner surface 72 of second spring 52. Actuator sidewall 68 of actuator cylinder 66 can additionally define one or more longitudinal slots 74 that correspond to and are shaped to accommodate connection points 62 of bearing block 60. In this way, actuator cylinder 66 can translate past first spring 50 with bearing block connection points 62 sliding along longitudinal slots 74.

This configuration of intermediate actuator 54 permits the translation of fluid spring assembly 12 along compression vector 28 to urge intermediate actuator 54 against second spring 52, and therefore simultaneously compress first spring 50 and second spring 52.

As first spring 50 and second spring 52 are functionally coupled in parallel, the compressive force applied by fluid spring assembly 12 to mechanical spring assembly 16 is shared between first spring 50 and second spring 52. That is, the overall force applied to mechanical spring assembly 16 is the sum of the compressive forces applied to each of first spring 50 and second spring 52. First spring 50 and second spring 52 can be disposed in any suitable configuration, provided that first spring 50 and second spring 52 are functionally coupled in parallel.

Although mechanical spring assembly 16 of isolator 5 is depicted as including two mechanical springs, mechanical spring assembly 16 can include additional mechanical springs, each functionally arranged in parallel by virtue of each spring having an intermediate actuator, each spring being compressed between its intermediate actuator and either an intermediate bearing block or an end surface of the isolator housing, and each intermediate actuator including appropriately configured slots or other apertures such that the intermediate actuators can be simultaneously urged by fluid spring assembly 12, and can simultaneously translate within isolator 5 without interfering with either an intermediate bearing block or any other intermediate actuator.

Preferably, isolator 5 can be employed in an environment where the compressive capacity of the isolator is not exceeded by any incoming shock or vibration. It may be advantageous, however, to configured isolator 5 so that during compression of isolator 5 a compression limit of fluid spring assembly 12 is reached before a compression limit of the mechanical spring assembly is reached. That is, it may be advantageous to configure isolator 5 so that mechanical spring assembly 16 displays a greater capacity than that of fluid spring assembly 12. In other words, first spring 50 and second spring 52 can be selected so that if and when the compressive capacity of fluid spring assembly 12 is reached, either due to a mechanical interaction with piston 34 or due to reaching the compressibility limit of viscous fluid 38 in second compartment 42 of bore 32, the mechanical spring assembly will still retain additional compressive capacity.

Applications

The presently disclosed liquid-mechanical isolators can be of particular use when isolating a load, or system of interest, from shock and vibration. A variety of systems may benefit from isolation from shock and vibration, and as used herein load 20 can include one or more devices, appliances, instruments, weapons systems, or other pieces of equipment in any combination and without limitation.

Figure 7:
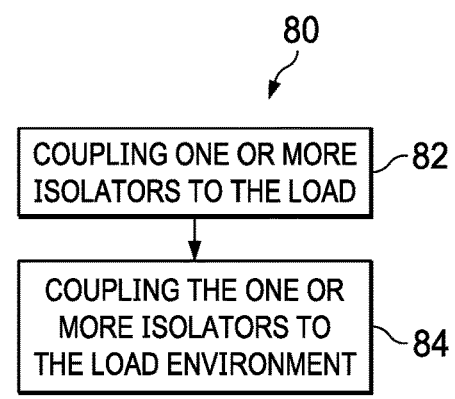
FIG. 7 provides a flowchart depicting an illustrative method of isolating a load from vibration and shock, according to the present disclosure.

Flowchart 80 of FIG. 7 provides a flowchart describing a method of isolating a load from vibration and shock, where the method includes coupling one or more isolators to the load, at step 82 of flowchart 80, and coupling the one or more isolators to the load environment, so that the weight of the load is supported by the one or more isolators, at step 84 of flowchart 80.

During use, load 20 is typically coupled directly or indirectly to first end 14 of isolator 5, while second end 18 is coupled directly or indirectly to environment 22 of isolator 5, where isolator 5 can be configured to dampen or absorb the relative motion of load 20 with respect to load environment 22.

In an exemplary installation, and as shown schematically in FIG. 3, each isolator 5 can be oriented so that longitudinal axis 26 of isolator 5 is substantially vertical, with first end 14 uppermost and second end 18 lowermost. In this configuration, surface fluid spring assembly 12 of each isolator 5 is oriented at first end 14, and coupling one or more isolators 5 to load 20 can include resting load 20 upon fluid spring assemblies 12. In this way, the one or more isolators 5 can function substantially similarly to a shock absorber on an auto.

Figure 8:
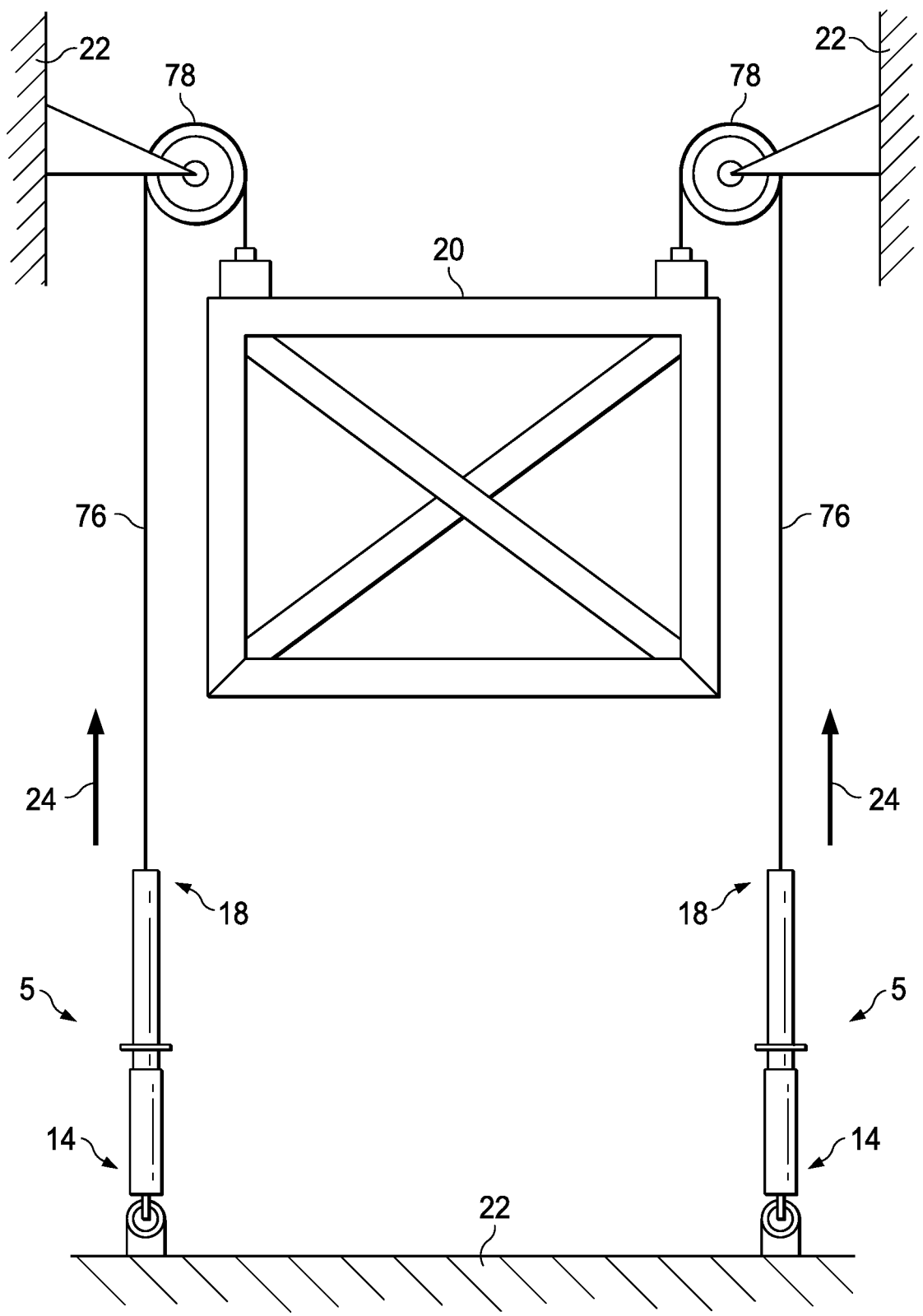
FIG. 8 semi-schematically depicts the isolation of an exemplary load from shock and vibration using shock and vibration isolators according to the present disclosure.

In an alternative and exemplary installation, as shown schematically in FIG. 8, each isolator 5 can be oriented so that longitudinal axis 26 of isolator 5 is substantially vertical, however in this installation second end 18 is disposed uppermost and first end 14 is lowermost. In this configuration, fluid spring assembly 12 of each isolator 5 is oriented at the lower end of isolator 5, and coupling one or more isolators 5 to load 20 can include coupling a loading cable 76 to each fluid spring assembly, extending each loading cable 76 upwardly within and through each isolator 5 along its longitudinal axis 26, and over an associated pulley 78. Each loading cable can then be coupled to a suspended load 20. In this way, the relative motion of load 20 relative to load environment 22 is exerted as compressive force applied upwardly by loading cable 76 to isolator 5 via fluid spring assembly 12.

EXAMPLES, COMPONENTS, AND ALTERNATIVES

The following numbered paragraphs describe selected aspects of the disclosed shock and vibration isolators, and methods of isolating a load from vibration and shock. The examples in these sections are intended for illustration and should not be interpreted as limiting the entire scope of the present disclosure. Each section may include one or more distinct embodiments or examples, and/or contextual or related information, function, and/or structure.

A1. A shock and vibration isolator, comprising a fluid spring assembly, and a mechanical spring assembly, wherein the fluid spring assembly and mechanical spring assembly are arranged in series, and the mechanical spring assembly includes a first spring and a second spring arranged so that a compressive force applied to the mechanical spring assembly simultaneously directly compresses the first spring and indirectly compresses the second spring via an intermediate actuator, such that the first and second spring are compressed in parallel.

A2. The isolator of paragraph A1, wherein a spring constant of the first spring and a spring constant of the second spring are substantially equal.

A3. The isolator of paragraph A1, wherein each of the first spring and the second spring of the mechanical spring assembly are compression coil springs having a longitudinal axis, and the first spring and second spring are arranged so that the longitudinal axes of the first spring and the second spring are coincident.

A4. The isolator of paragraph A1, wherein the fluid spring assembly includes a fluid-filled bore and a piston slidably mounted within the bore, such that the piston divides the bore into a first compartment and a second compartment such that a compression of the fluid spring assembly moves the piston within the bore and compresses the fluid in the second compartment of the bore.

A5. The isolator of paragraph A4, wherein the compressive force applied to the isolator is applied along a single compression vector; each of the first spring and the second spring are compression coil springs; and the isolator is configured so that the piston of the fluid spring assembly and the coils of each of the first and second springs are aligned with the single compression vector.

A6. The isolator of paragraph A4, wherein the isolator is configured so that during compression of the isolator a compression limit of the fluid spring assembly is reached before a compression limit of the mechanical spring assembly is reached.

A7. The isolator of paragraph A1, wherein the isolator has a longitudinal axis, and the isolator is oriented so that the longitudinal axis is substantially vertical, the fluid spring assembly is disposed at a lower end of the isolator, and the compressive force applied to the isolator is applied upwardly to the fluid spring assembly.

A8. The isolator of paragraph A7, wherein the compressive force is applied upwardly to the fluid spring assembly by a loading cable coupled to the fluid spring assembly, where the loading cable extends within and through the isolator along a longitudinal axis of the isolator.

A9. The isolator of paragraph A1, further comprising an isolator housing, wherein the fluid spring assembly is configured to directly compress the first spring against a bearing block that is fixed to the isolator housing.

A10. The isolator of paragraph A9, wherein the fluid spring assembly is configured to indirectly compress the second spring by urging an intermediate actuator against the second spring to compress the second spring against an interior surface of the isolator housing.

A11. The isolator of paragraph A10, wherein the intermediate actuator includes a cylinder that is slidably disposed within the isolator, surrounds at least a portion of the first spring, and is configured to slidably translate past the bearing block so as to compress the second spring.

A12. The isolator of paragraph A11, wherein the bearing block is coupled to the isolator housing at one or more points, and the intermediate actuator cylinder defines one or more slots along a length of the cylinder to accommodate the points of attachment of the bearing block, such that the cylinder can slidably translate past the bearing block.

B1. A shock absorber, comprising a cylindrical housing, a fluid spring assembly disposed at a first end of the cylindrical housing, the fluid spring assembly including a fluid-filled bore and a piston slidably mounted within the bore, and a mechanical spring assembly disposed at a second end of the cylindrical housing and in series with the fluid spring assembly, wherein the mechanical spring assembly includes a first coil spring and a second coil spring disposed sequentially and in alignment within the cylindrical housing, configured so that a compressive force applied to the mechanical spring assembly by the fluid spring assembly results in the first coil spring acting directly on the first coil spring to compress the first coil spring against a bearing block fixed to the cylindrical housing, and the fluid spring assembly simultaneously acting indirectly on the second coil spring via an intermediate actuator that compresses the second coil spring against the second end of the cylindrical housing, the compressive force therefore being applied to the first coil spring and the second coil spring in parallel.

B2. The shock absorber of paragraph B1, wherein the bearing block is coupled to the cylindrical housing, and the intermediate actuator includes a sliding cylinder concentrically mounted within the cylindrical housing that is configured to slidably translate along the bearing block to compress the second coil spring.

B3. The shock absorber of paragraph B1, wherein the shock absorber is configured to be suspended vertically so that the first end of the cylindrical housing is disposed at a lowermost end of the shock absorber, further comprising a loading cable coupled to the fluid spring assembly at the lowermost end of the shock absorber and extending upwardly through the shock absorber.

B4. The shock absorber of paragraph B3, wherein the loading cable extends along a longitudinal axis of the first coil spring, the second coil spring, the intermediate actuator, and the cylindrical housing.

C1. A method of isolating a load from vibration and shock, comprising coupling one or more isolators to the load, and coupling the one or more isolators to a load environment, so that the weight of the load is supported by the one or more isolators, wherein each isolator includes a fluid spring assembly and a mechanical spring assembly, the fluid spring assembly being disposed at a first end of the isolator and including a fluid-filled bore and a piston slidably mounted within the bore so that a shock transmitted to the isolator from the environment acts upon the fluid spring assembly and the mechanical spring assembly in series, wherein the mechanical spring assembly includes a first coil spring and a second coil spring arranged so that a translation of the fluid spring assembly against the mechanical spring assembly will directly compress the first coil spring between the fluid spring assembly and a bearing block while simultaneously indirectly compressing the second coil spring between an intermediate actuator and a second end of the isolator, such that while the fluid spring assembly is compressed in series with the mechanical spring assembly, and the first coil spring is compressed in parallel with the second coil spring.

C2. The method of paragraph C1, wherein coupling the one or more isolators to the load environment includes attaching the one or more isolators to a solid surface so that the fluid spring assembly is disposed beneath the mechanical spring assembly; and coupling the one or more isolators to the load includes suspending the load from one or more loading cables that each extend upwardly and over a respective pulley member, and then extend downwardly through a center of each isolator and attaches to the fluid spring assembly of that isolator.

C3. The method of paragraph C1, wherein coupling the one or more isolators to the load environment includes disposing each isolator substantially vertically on a solid surface so that the fluid spring assembly of each isolator is uppermost, and coupling the one or more isolators to the load includes resting the load upon the one or more fluid spring assemblies.

C4. The method of paragraph C1, wherein coupling one or more isolators to the load includes coupling one or more isolators to a system of interest that includes one or more vehicles, buildings, instruments, and weapons systems.

ADVANTAGES, FEATURES, BENEFITS

The different embodiments and examples of the shock and vibration isolators and their methods of use described herein provide several advantages over those that incorporate previous isolator designs.

As discussed above, by disposing the two mechanical springs of the mechanical spring assembly in parallel, rather than placing them in series, the spring constant of the resulting isolator can be substantially increased without increasing the footprint of the isolator itself. The isolators of the present disclosure can therefore not only provide enhanced shock and vibration isolation to protect sensitive or critical systems, but the protection of such systems can be enhanced without requiring larger isolators, which can be particularly advantageous when refitting or retrofitting existing systems, where space can be at a premium.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A shock and vibration isolator, comprising:
a fluid spring assembly; and
a mechanical spring assembly;
wherein the fluid spring assembly and mechanical spring assembly are arranged in series;
wherein the mechanical spring assembly includes a first spring and a second spring that are coaxial with one another and functionally arranged in parallel; and
wherein the isolator has a longitudinal axis, and the isolator is oriented so that the longitudinal axis is substantially vertical, the fluid spring assembly is disposed at a lower end of the isolator, and compressive force applied to the isolator is applied upwardly to the fluid spring assembly by a loading cable coupled to the fluid spring assembly, where the loading cable extends within and through the isolator along the longitudinal axis of the isolator.

2. The isolator of claim 1, wherein a spring constant of the first spring and a spring constant of the second spring are substantially equal.

3. The isolator of claim 1, wherein each of the first spring and the second spring of the mechanical spring assembly are compression coil springs having a longitudinal axis, and the first spring and second spring are arranged so that the longitudinal axes of the first spring and the second spring are coincident.

4. The isolator of claim 1, wherein the fluid spring assembly includes a fluid-filled bore and a piston slidably mounted within the bore, such that the piston divides the bore into a first compartment and a second compartment such that a compression of the fluid spring assembly moves the piston within the bore and compresses the fluid in the second compartment of the bore.

5. The isolator of claim 4, wherein compressive force applied to the isolator is applied along a single compression vector; each of the first spring and the second spring are compression coil springs; and the isolator is configured so that the piston of the fluid spring assembly and the coils of each of the first and second springs are aligned with the single compression vector.

6. The isolator of claim 4, wherein the isolator is configured so that during compression of the isolator a compression limit of the fluid spring assembly is reached before a compression limit of the mechanical spring assembly is reached.

7. The isolator of claim 1, further comprising an isolator housing, wherein the fluid spring assembly is configured to directly compress the first spring against a bearing block that is fixed to the isolator housing.

8. The isolator of claim 7, wherein the fluid spring assembly is configured to indirectly compress the second spring by urging an intermediate actuator against the second spring to compress the second spring against an interior surface of the isolator housing.

9. The isolator of claim 8, wherein the intermediate actuator includes a cylinder that:
is slidably disposed within the isolator;
surrounds at least a portion of the first spring; and
is configured to slidably translate past the bearing block so as to compress the second spring.

10. The isolator of claim 9, wherein the bearing block is coupled to the isolator housing at one or more points, and the intermediate actuator cylinder defines one or more slots along a length of the cylinder to accommodate the points of attachment of the bearing block, such that the cylinder can slidably translate past the bearing block.

11. A shock absorber, comprising:
a cylindrical housing;
a fluid spring assembly disposed at a first end of the cylindrical housing, the fluid spring assembly including a fluid-filled bore and a piston slidably mounted within the bore; and
a mechanical spring assembly disposed at a second end of the cylindrical housing and in series with the fluid spring assembly;
wherein the mechanical spring assembly includes a first coil spring and a second coil spring disposed sequentially and in alignment within the cylindrical housing, configured so that a compressive force applied to the mechanical spring assembly by the fluid spring assembly results in the first coil spring acting directly on the first coil spring to compress the first coil spring against a bearing block fixed to the cylindrical housing, and the fluid spring assembly simultaneously acting indirectly on the second coil spring via an intermediate actuator that compresses the second coil spring against the second end of the cylindrical housing, the compressive force therefore being applied to the first coil spring and the second coil spring in parallel.

12. The shock absorber of claim 11, wherein the bearing block is coupled to the cylindrical housing, and the intermediate actuator includes a sliding cylinder concentrically mounted within the cylindrical housing that is configured to slidably translate along the bearing block to compress the second coil spring.

13. The shock absorber of claim 11, wherein the shock absorber is configured to be suspended vertically so that the first end of the cylindrical housing is disposed at a lowermost end of the shock absorber, further comprising a loading cable coupled to the fluid spring assembly at the lowermost end of the shock absorber and extending upwardly through the shock absorber.

14. The shock absorber of claim 13, wherein the loading cable extends along a longitudinal axis of the first coil spring, the second coil spring, the intermediate actuator, and the cylindrical housing.

15. A method of isolating a load from vibration and shock, comprising:
coupling one or more isolators to the load; and
coupling the one or more isolators to a load environment, so that a weight of the load is supported by the one or more isolators;
wherein each isolator includes a fluid spring assembly and a mechanical spring assembly;
the fluid spring assembly being disposed at a first end of the isolator and including a fluid-filled bore and a piston slidably mounted within the bore so that a shock transmitted to the isolator from the load environment acts upon the fluid spring assembly and the mechanical spring assembly in series;
wherein the mechanical spring assembly includes a first coil spring and a second coil spring arranged so that a translation of the fluid spring assembly against the mechanical spring assembly will directly compress the first coil spring between the fluid spring assembly and a bearing block while simultaneously indirectly compressing the second coil spring between an intermediate actuator and a second end of the isolator;
such that while the fluid spring assembly is compressed in series with the mechanical spring assembly, and the first coil spring is compressed in parallel with the second coil spring.

16. The method of claim 15, wherein coupling the one or more isolators to the load environment includes attaching the one or more isolators to a solid surface so that the fluid spring assembly is disposed beneath the mechanical spring assembly; and coupling the one or more isolators to the load includes suspending the load from one or more loading cables that each extend upwardly and over a respective pulley member, and then extend downwardly through a center of each isolator and attaches to the fluid spring assembly of that isolator.

17. The method of claim 15, wherein coupling the one or more isolators to the load environment includes disposing each isolator substantially vertically on a solid surface so that the fluid spring assembly of each isolator is uppermost, and coupling the one or more isolators to the load includes resting the load upon the one or more fluid spring assemblies.

18. The method of claim 15, wherein coupling one or more isolators to the load includes coupling one or more isolators to a system of interest that includes one or more vehicles, buildings, instruments, and weapons systems.

19. A shock and vibration isolator, comprising:
a fluid spring assembly;
a mechanical spring assembly; and
an isolator housing;
wherein the fluid spring assembly and mechanical spring assembly are arranged in series, and the mechanical spring assembly includes a first spring and a second spring that are coaxial with one another and functionally arranged in parallel;
wherein the fluid spring assembly is configured to directly compress the first spring against a bearing block that is fixed to the isolator housing; and
wherein the fluid spring assembly is configured to indirectly compress the second spring by urging an intermediate actuator against the second spring to compress the second spring against an interior surface of the isolator housing.

20. The isolator of claim 19, wherein the intermediate actuator includes a cylinder that:
is slidably disposed within the isolator;
surrounds at least a portion of the first spring; and
is configured to slidably translate past the bearing block so as to compress the second spring.

21. The isolator of claim 20, wherein the bearing block is coupled to the isolator housing at one or more points, and the intermediate actuator cylinder defines one or more slots along a length of the cylinder to accommodate points of attachment of the bearing block, such that the cylinder can slidably translate past the bearing block.

* * * * *